United States Patent [19]

Bingham

[11] Patent Number: 5,202,049

[45] Date of Patent: * Apr. 13, 1993

[54] SEALER FINISH REMOVER COMPOSITIONS

[75] Inventor: Mary E. Bingham, Santa Ana, Calif.

[73] Assignee: Elf Atochem North America, Inc., Philadelphia, Pa.

[ * ] Notice: The portion of the term of this patent subsequent to Mar. 17, 2009 has been disclaimed.

[21] Appl. No.: 759,206

[22] Filed: Sep. 11, 1991

Related U.S. Application Data

[63] Continuation of Ser. No. 610,196, Nov. 6, 1990, abandoned.

[51] Int. Cl.$^5$ .......................... C11D 7/22; C11D 7/32; B08B 7/00
[52] U.S. Cl. ..................................... 252/162; 134/38; 134/39; 134/40; 252/153; 252/170; 252/171; 252/DIG. 8
[58] Field of Search ............... 252/153, 162, 170, 171, 252/DIG. 8; 134/38, 39, 40

[56] References Cited

U.S. PATENT DOCUMENTS

| | | | |
|---|---|---|---|
| 4,081,395 | 3/1978 | Talley | 252/534 |
| 4,554,026 | 11/1985 | Cosper et al. | 134/38 |
| 4,565,644 | 1/1986 | Smith et al. | 252/153 |
| 4,678,605 | 7/1987 | Geke et al. | 252/547 |
| 4,814,108 | 3/1989 | Geke et al. | 252/545 |
| 4,857,114 | 8/1989 | Brumbaugh et al. | 252/DIG. 14 |
| 4,915,864 | 4/1990 | Kita et al. | 252/132 |
| 5,096,610 | 3/1992 | Bingham | 252/162 |

*Primary Examiner*—Paul Lieberman
*Assistant Examiner*—William S. Parks

[57] ABSTRACT

A sealer finish remover composition containing a solvent, water, and an organosilicon complex formed from a silicate such as sodium metasilicate and a linear, 6–10 carbon, organic compound such as sodium n-octane sulfonate.

10 Claims, No Drawings

SEALER FINISH REMOVER COMPOSITIONS

This is a continuation of copending application Ser. No. 07/610,196 filed on Nov. 6, 1990 now abandoned.

FIELD OF THE INVENTION

This invention relates to compositions useful for removing solvent-based sealer finishes, especially to improved compositions containing an organosilicon complex.

BACKGROUND

Solvent-based sealer finishes (such as oil modified polyurethanes, moisture cured urethanes, acrylic-urethanes, solvent solution acrylics, catalyzed epoxies, and polymerized vegetable oils) usually require removal by methylene chloride paint stripper formulations. Because health and environmental concerns are limiting and/or obsoleting use of such chlorinated solvents, the industry is in need of efficient, alternative stripper compositions.

SUMMARY OF THE INVENTION

A sealer finish remover composition is provided containing (a) a solvent selected from amines, glycol ethers, and mixtures thereof, (b) water, and (c) an organosilicon complex formed from a silicate such as sodium metasilicate and a linear, 6-10 carbon (optimally, 8 carbon), organic compound such as caprylic acid or sodium n-octane sulfonate. The formulations may be tailored for either machine or mop-on, mop-off application, the latter strippers generally having higher solvent concentrations and pH.

DETAILED DESCRIPTION OF INVENTION

It has now been found that the use of a linear, 6-10 carbon, organic compound in the presence of silicates, or metasilicates, accelerates sealer finish removal and solvent efficiency. The addition of an organic such as n-octane sulfonate (preferably sodium n-octane sulfonate) or caprylic acid to metasilicate (preferably sodium metasilicate) results in the formation of an organosilicon complex. When incorporated in the subject solvent-containing formulations the floor dwell time (to dissolve the finish) is as little as 1–2 minutes and finish removal can be accomplished in one application.

The solvents can be amines (typically diethanolamine, diethylamine, or, preferably, monoethanolamine) and/or one or more glycol ethers (preferably ethylene glycol monobutyl ether and/or ethylene glycol phenyl ether). The solvents generally comprise about 10–30% by weight of the formulation, more typically about 13–24%. Water generally comprises about 50–84% of the formulation, more typically about 58–77%.

The silicate generally comprises about 4–8% of the formulation, more typically about 5 to 7.2%. The organic compound generally comprises 1 to 30% (more typically about 2.9 to 8%) and may contain 6-10 carbons such as caproic acid, decylenic acid, caprylic acid, or alkali salts such as sodium n-octane sulfonate. Sodium hydroxide, silicates, and/or alkali salts are present in such formulations to keep the pH elevated and to prevent calcium deposits. Conventional surfactants (such as fluorinated alkyl polyoxethylene ethanols—available commercially, for example, as FLUORAD FC-170-C, a product of the 3M Company) and dyes are also optionally added in minor amounts. For mop-on, mop-off applications, sodium xylenesulfonate may be added to assist in solubilization.

Typical formulations for mop-on, mop-off (A) and machine (B) applications are as follows (in percent by weight).

| Ingredient | A | B |
| --- | --- | --- |
| Caprylic acid | — | 2.9% |
| Sodium n-octane sulfonate (40%) | 8% | — |
| Sodium metasilicate (60%) | 5% | 7.2% |
| Monoethanolamine | 7% | 4% |
| Ethylene glycol monobutyl ether | 5% | 9% |
| Ethylene glycol phenyl ether | 12% | — |
| Water | 58.5% | 76.9% |
| FC-170-C Fluorosurfactant | 0.1% | — |
| Sodium Xylenesulfonate (40%) | 4.4% | — |

What is claimed is:

1. A sealer finish remover composition comprising effective amounts of (a) a solvent selected from diethylamine, diethanolamine, monoethanolamine, ethylene glycol monobutyl ether, ethylene glycol phenyl ether, and mixtures thereof, (b) water, (c) about 4–8 weight % of a metasilicate, and (d) about 1–30 weight % of a linear, 6-10 carbon, organic compound selected from caprylic acid, n-octane sulfonate, caproic acid, decylenic acid, and their alkali salts.

2. The composition of claim 1 further comprising (e) a surfactant.

3. The composition of claim 1 wherein the silicate is sodium metasilicate and the organic compound is selected from caprylic acid and sodium n-octane sulfonate.

4. A sealer finish remover composition as in claim 1 consisting essentially of monoethanolamine, ethylene glycol monobutyl ether, water, caprylic acid, and sodium metasilicate.

5. A sealer finish remover composition as in claim 1 consisting essentially of monoethanolamine, ethylene glycol monobutyl ether, ethylene glycol phenyl ether, water, sodium metasilicate, sodium n-octane sulfonate, sodium xylenesulfonate, and a fluorinated alkyl polyoxyethylene ethanol.

6. A process for removing a sealer finish which comprises contacting said finish with an effective amount of a composition comprising (a) a solvent selected from diethylamine, diethanolamine, monoethanolamine, ethylene glycol monobutyl ether, ethylene glycol phenyl ether, and mixtures thereof, (b) water, (c) a metasilicate, and (d) a linear, 6-10 carbon, organic compound selected from caprylic acid, n-octane sulfonate, caproic acid, decylenic acid, and their alkali salts.

7. The process of claim 6 wherein the composition further comprises (e) a surfactant.

8. The process of claim 6 wherein the organic compound comprises about 1–30 weight % of the composition.

9. The process of claim 6 wherein the composition consists essentially of monoethanolamine, ethylene glycol monobutyl ether, water, caprylic acid, and sodium metasilicate.

10. The process of claim 6 wherein the composition consists essentially of monoethanolamine, ethylene glycol monobutyl ether, ethylene glycol phenyl ether, water, sodium metasilicate, sodium n-octane sulfonate, sodium xylenesulfonate, and a fluorinated alkyl polyoxyethylene ethanol.

* * * * *